United States Patent [19]
Choate

[11] 3,754,846
[45] Aug. 28, 1973

[54] APPARATUS FOR SINGLE CAVITY INJECTION MOLDING OF OIL SEALS

[75] Inventor: James Robert Choate, Rochester, N.H.

[73] Assignee: CPI, Inc., Bristol, N.H.

[22] Filed: Jan. 21, 1972

[21] Appl. No.: 219,615

Related U.S. Application Data

[63] Continuation-in-part of Ser. No. 128,080, March 25, 1971, abandoned.

[52] U.S. Cl.............. 425/125, 425/129, 425/249, 425/405, 425/812, 425/DIG. 60
[51] Int. Cl........ B29c 27/30, B29d 3/00, B29f 1/10
[58] Field of Search.................... 425/180, 249, 117, 425/129, 809, 812, 125, 242, DIG. 60, 405; 264/102

[56] References Cited
UNITED STATES PATENTS

| | | | |
|---|---|---|---|
| 2,643,620 | 6/1953 | Miller | 425/812 X |
| 2,883,706 | 4/1959 | Quinche et al. | 425/125 |
| 3,079,632 | 3/1963 | Peickii | 425/112 |
| 3,207,833 | 9/1965 | D'errico | 425/125 X |

*Primary Examiner*—Richard B. Lazarus
*Attorney*—Lee A. Strimbeck

[57] ABSTRACT

In the repetitive single cavity injection molding of an oil seal reinforced with a casing, with vacuum being applied to the mold cavity, the molding composition is forced rapidly through fine orifices under high pressure and high internal shear into the mold cavity so that a predominant amount of the heat required for curing comes from the mechanical working. A three-part mold of special design is used wherein the orifices are annularly spaced about and formed between the mold top through which injection occurs and a center piece that defines the interior walls of the oil seal. The center piece is of a special three-part construction so that it functions as a vacuum valve and to assist in ejection of the completed seal. A casing of special design is used and mold pins are not required to support and align the casing.

12 Claims, 10 Drawing Figures

Patented Aug. 28, 1973

INVENTOR.
JAMES R. CHOATE
BY Lee A. Strimbeck
ATTORNEY

Patented Aug. 28, 1973  3,754,846

INVENTOR.
JAMES R. CHOATE
BY
Lee A. Strimbeck
ATTORNEY

INVENTOR.
JAMES R. CHOATE
BY
*Lee A. Strimbuck*
ATTORNEY

APPARATUS FOR SINGLE CAVITY INJECTION MOLDING OF OIL SEALS

RELATED APPLICATIONS

This application is a Continuation-in-Part of Ser. No. 128,080, filed Mar. 25, 1971 by the present inventor and having the same title now abandoned.

Reference is made to another copending application by the present inventor, Ser. No. 197,206, "High Speed Single Cavity Molding Apparatus," filed Nov. 10, 1971 and assigned to the assignee of the present application. This application describes an automatic molding machine particularly suited to the requirements of this invention.

PRIOR ART

U.S. Pat. No. 3,079,632 by Vasalie L. Peickii is addressed to the same problem as the present invention — that of high speed, automatic, single cavity molding of an oil seal having a reinforcing casing, and well describes the problems associated therewith, particularly with regard to heating, and the advantages to be obtained. The patentee uses an elastomer preform to load the mold, and does not contemplate injection molding.

U.S. Pat. No. 2,249,141, issued to L.A. Johnson, illustrates a reinforcing casing construction similar to that used in the present invention. However, either the location and/or the collapsible nature of the indents in the patentee's casing construction makes it unsuitable for the purposes of this invention.

U.S. Pat. No. 2,949,635 by L.L. Chiero is also of interest as showing the use of mold pins to support the casing. Such pins create depressions in the oil seal rim which often exposes the metal and causes rusting. Mold pins are not required in the mold design of this invention.

THIS INVENTION

This invention is a single cavity mold design and injection molding procedure permitted thereby for the rapid automatic molding of substantially finished circular oil seals, or shaft seals, having superior physical properties. The oil seals as ejected from the mold are complete without further grinding or cutting being required to form the sealing lip. Some tumbling may be required to remove the tear line left from flash removal. This tear line is, in a preferred mold design wherein the seal is molded "upside down," preferably located in a non-critical area of the seal, remote from the sealing lip.

The split-cavity mold of this invention is composed of three main pieces defining the circular oil seal mold cavity; a mold top containing the sprue and at least in part, if not totally, defining a fine orifice through which injection occurs; a mating mold bottom having a truncated valve seat; and a center piece defining the interior surfaces of the oil seal and forming with the mold bottom a valve through which a vacuum is placed on the mold cavity. The center piece is composed of three sections — a mandrel or stem, an intermediate section having the largest internal diameter of the oil seal and larger than the smallest diameter of the metal casing and being truncated to function as a vacuum valve with the mold bottom, and a top section extending through the casing and mating with the mold top.

In one design, the mold top contains an annular accumulation or pressure equalizing and distribution cavity dispersed between the sprue and the fine orifice, which is annular and formed between the under surface of the mold top and the top section of the center piece. Also in this design, an outer annular shoulder engages a matched annular wall during the closing of the mold top and bottom to align the same and to form a seal against the vacuum being drawn. The mold pieces in this design preferably mate externally about the oil seal to form a flashless joint, although a flash joint with or without a flash ring can be provided if desired.

In another mold design, the mold parts are preferably gapped externally about the oil seal to form a flash joint and channel for the application of vacuum. Three or more fine orifices equally spaced about the center line in the mold top and connected by radial sprues to a central injection conduit are used to inject the molding composition. The top of center piece and the bottom surface of the mold top mate at the circular interior edge of the oil seal in a tight, flashless joint. The center of the top of the center piece is preferably recessed to form a flash lock that communicates with the material in the radial sprues so that the same can be retracted and discarded during mold opening.

The casing usually used in the industry is a circular sheet steel stamping chemically treated to promote adhesion and has a L-shape rim in cross section. In this invention, the casing is restrained against lateral movement by reason of one of the annular edges of the casing abutting an inner annular shoulder in the mold bottom. In addition, mold pins are not used. One of the edges of the L-shaped is pipped or has worked hardened distentions, preferably three, that rest against at least one of the surfaces of the mold cavity and restrain the casing against movement while permitting the molding compound to flow under and around the edge. These pips can be located on a radial and/or vertical edge, i.e., vertically as to rest on the mold bottom, and radially as to rest against a surface formed between the mold bottom and a flank of an angle. These distortions are specifically located on the edge, do not split or cut the edge, and are not amenable to collapse because they are formed by working, swaging, coining, etc. and hardening the metal without rupture. It has been generally observed that the hydraulic pressures within the mold as the rubber flows in and impinges on the case causes anything less than a work-hardened or strengthened pip to flatten out.

In many prior art injection molding attempts, the casing was subject to severe distortion or mangling by the forces occasioned by the inflowing compound and this does not occur in the design of this invention. In this connection, it is preferred, if not mandatory, that one of the leading edges of the L-shaped casing be used to split or divide the flow of the compound issuing from the fine orifice so that the force of the flow holds the case in place. Both sides of the case receive almost equal flows, but the inside of the case and mold is slightly favored so that the sealing and wiper lips are formed first. Thus, residual air in the mold tends to be carried to the outside and the vital lips are fully formed of prime rubber before any appreciable cure has taken place that would impede fill-out of the mold contour. The last areas in the mold cavity are filled out with rubber usually partially cured in transit and require greater pressure to fill out, as evidenced by an occasional showing of flow joints and knit marks. These last to fill out areas are therefore desirably on the outside, non-critical areas of the seals.

The pips of the case space the edge of the case 0.005 to 0.015 inch from the mold surface, sufficient for rubber to flow between the case and the mold and have enough "body" to cure and cohere and come away with the case and seal. If the edge of the case were to rest directly on the mold surface, rubber forces into the joint between the two as a thin uneven film having no "body" which tends not to adhere reliably to the mold or the casing, hence creating contamination and build up.

In the molding procedure employed by this invention, the mold is mounted on an automatic injection molding machine designed to cyclically insert the casing, close the mold while drawing vacuum, inject the molding compound, open the mold, and eject the completed seal, while maintaining the proper temperature conditions. Usually at least two molds are used alternatively, the two lower working alternatively with one upper.

The molding compound or rubber is injected into the mold cavity under high pressure through the fine orifice so that it is essentially a liquid as it enters the mold cavity. In passing through the fine orifice it is subjected to extreme mechanical working and shear, which, besides causing a desirable heat jump in the compound to the curing temperature, it is believed that this creates reactive sites in the compound which aid in the curing reaction. A predominant part, i.e., over 80 percent, of the heat required for processing is imparted in this manner, and usually 100 percent of the heat required is imparted by this mechanical working so that it is necessary to only maintain the mold at a temperature sufficient to prevent material abstraction of heat from the compound.

This manner of heat generation has been found to have unexpected advantages. The cure can be viewed as being from the inside out so that case hardening is avoided. The cure is decidedly more complete and/or uniform so that substantially improved physicals result. Also, in a prefereed embodiment of this invention, the oil seal is molded "upside down," i.e., the critical area of the seal is located the furthest away from the inlet orifice, which, as is known, causes a better formation to occur in the region of the sealing lip. Also, this type of cure wherein the heat is generated within the rubber makes the cure and the time to cure, relatively independent of the volume of the rubber and size of the seal. In conventional processes where the rubber is heated in the mold from the outside in, the natural good insulating properties of the rubber make time of cure very sensitive to volume.

The present molding procedure, because of, inter alia, the manner of imparting heat, has the advantage of rapid cycle times. Curing is regularly accomplished in less than 10 seconds, often less than 5, and total cycle times can be less than 30 seconds.

Since mold pins are not required, there are no unnecessary obstructions to the flow of the compound as it fills the mold. Aside from the cost of the pins, their impediment to flow and their causing of buildup of fallout or residue in the lee of the flow, pins make it impossible to clean a mold by simple swiping with metal wool or cloth. In the present invention, the molds not only resist build-up of molding compound fall-out, but they are readily and speedily cleaned.

Of course, this invention permits one to avoid the large investment required for conventional multi-cavity molds. The prototype mold used to secure customer acceptance can be the same one used for production.

THE DRAWINGS

FIG. 1 illustrates in vertical cross section an injection mold designed according to this invention;

FIG. 2 similarly illustrates another mold design, only the left half being shown;

Figure 8:
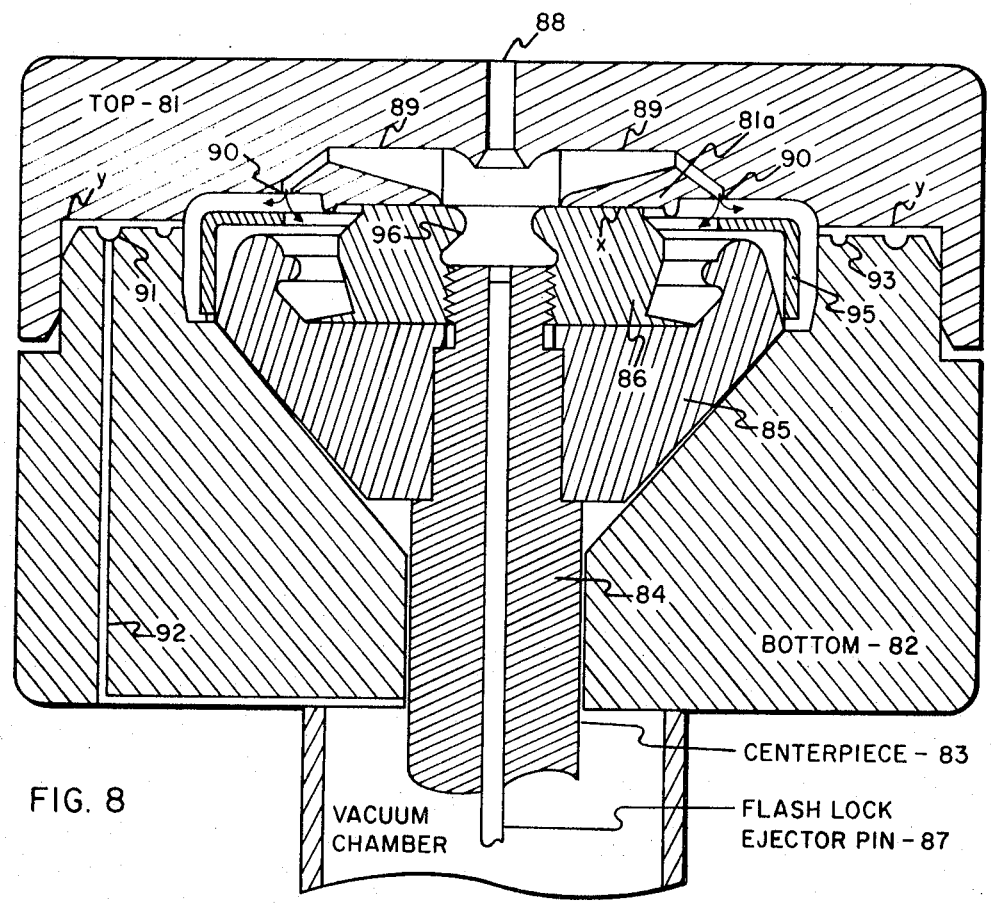
FIG. 8 is a vertical cross section of a third type of mold design.
Figure 9:
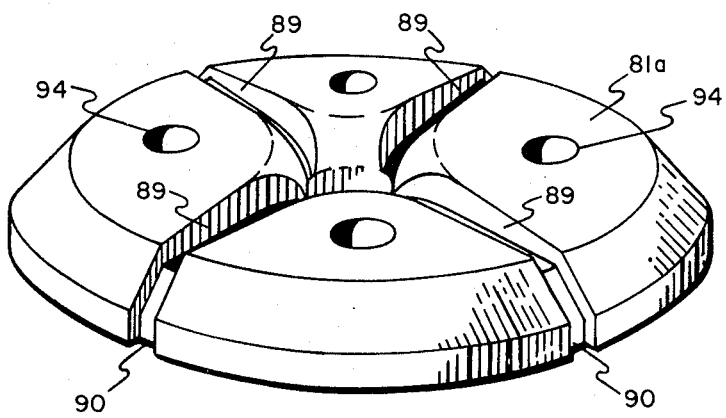
Figure 10:
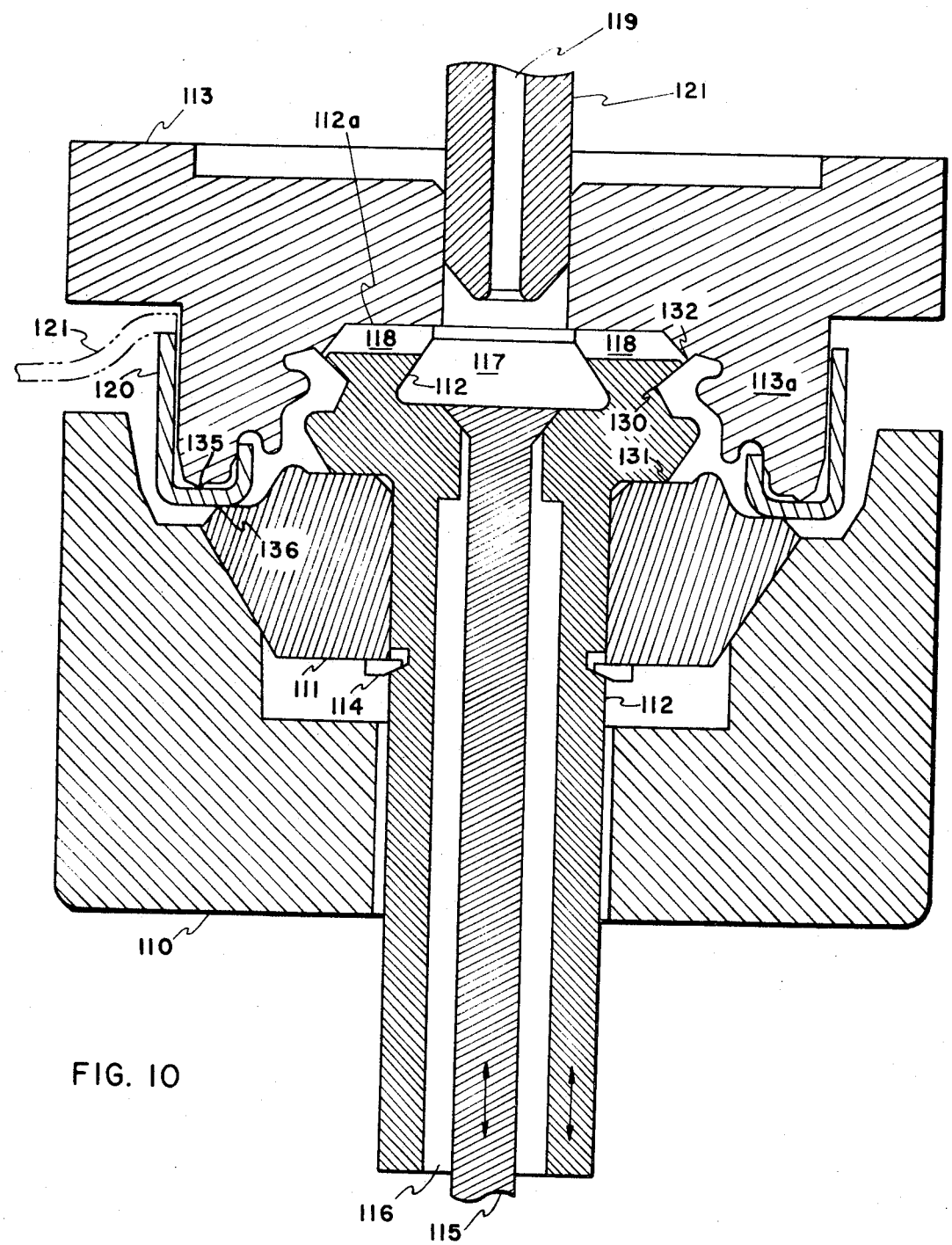

FIG. 9 is a perspective view of the removable bridge section of the mold of FIG. 8, that defines the radial runners; and FIG. 10 is a vertical cross section of a fourth type of mold design wherein the cylindrical wall of the case is external of the mold cavity and a seal is effected by pinching the end wall of the case between off-set sealing ridges or rings on the mold top and bottom, which ridges leave distinctive coinage marks on the case.

DESCRIPTION

Figure 1:
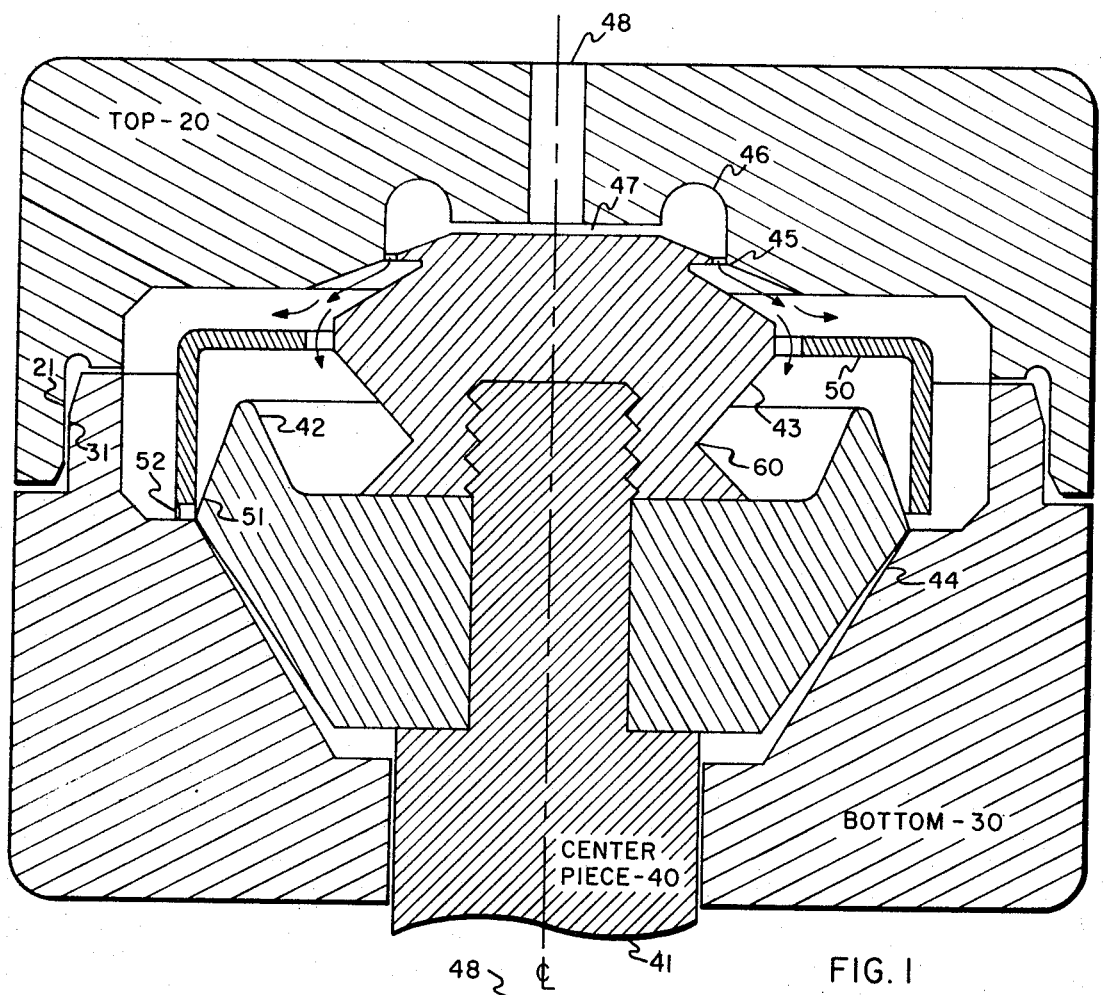
Figure 2:
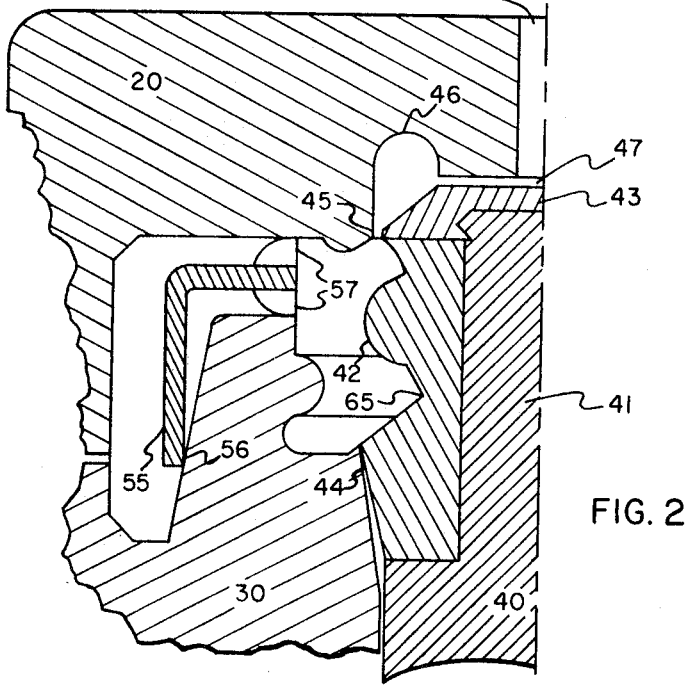

Referring to FIGS. 1 and 2, the mold, shown in the closed position as at the end of curing, consists of three main pieces: a top 20, a bottom 30, and a center piece 40. The center piece consists of three sections: a stem 41, an intermediate section 42, and a top section 43, suitably held together as by threads. The metal casing is illustrated at 50 in FIG. 1 and 55 in FIG. 2.

All parts are circular about the indicated center line. As there are temperature gradients from the edge to the center of the mold for each piece, this helps to avoid binding.

Center piece 40 is moveable upwards a few thousandths and piece 42 forms at 44 a valve with bottom 30. The taper on 42 is slightly greater than on the valve seat, and the two may be ground in place to assure a good match. An upper annular leading edge of top section 43 mates with the annular shoulder of top piece 20 to form a fine annular orifice 45. The orifice gap can be, for example, 0.002 inch.

The top of section 43 forms with the undersurface of top piece 20 a circular sprue, which can be, for example, 0.010 inch thick, to which the molding compound is introduced from the molding machine via central sprue 48. Any conventional molding machine can be used, such as ram or screw. The pressure at the entrance to sprue 48 is quite high, e.g. 10,000 to 60,000 psi (calculated). The compound at this point, while plasticized and preheated, e.g. to 160° F, may be considered to be essentially a solid and is well below, say at least 100° F, its cure temperature, e.g. which can be greater than 500° F.

Circular sprue 47 preferably feeds into an annular pressure equalizing and distribution cavity 46, and thence into the fine orifice. This helps to assure even feed about the periphery of the casing 50. The pressure after the orifice is only in the order of 1,000 to 6,000 psi, i.e., in this design 90 percent or more of the energy is given up to mechanical working in passing through the annular orifice. The energy input of the molding machine is, of course, varied as required to control the inlet pressure and pressure drop over the orifice.

The circular sprue 47, distribution ring 46 and fine orifice 45 produce a tear cap which separates from the oil seal at the bottom of the fine orifice and is located in a non-critical area of the oil seal so that rough edges or debris are not a problem. The lip of the oil seal is located at 60 in FIG. 1 and 65 in FIG. 2, and it can be seen that it is complete as made without need for further cutting or grinding.

The metal casings are restrained against lateral movement by reason of annular contact with a suitable shoulder in the mold. In FIG. 1 this annular contact is at 51 on the intermediate section 42 of the center peice, and in FIG. 2 it is at 56 on a shoulder of the bottom piece.

Figure 4:
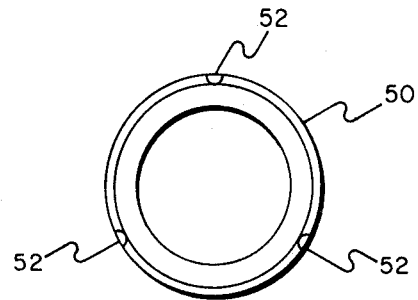
FIG. 4 is a bottom view of one type of casing taken along line 4—4 of FIG. 5.
Figure 5:
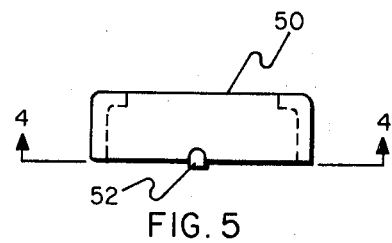
FIG. 5 is a side view of the casing of FIG. 4.

The casings have distortions on one of their edges to support them from a horizontal surface of the mold. Casing 50 of FIG. 1 is illustrated in FIGS. 4 and 5. Three small pips 52 are formed by slightly indenting and pushing out the edge as with a punch to create a small projection that might extend, for example, 0.005 inch. This swaging of the metal to form the pips hardens and strengthens it at the pips so that the pips are resistant to collapse.

Figure 6:
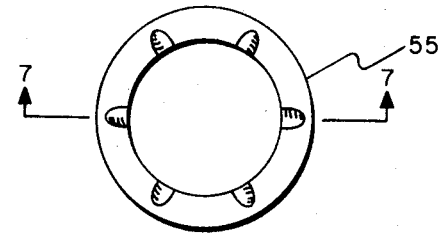
FIG. 6 is a top view of another type of casing.
Figure 7:
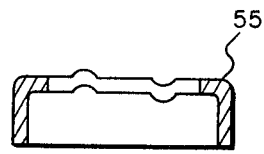
FIG. 7 is a sectional view in elevation of the casing of FIG. 6, taken along the line 7—7 thereof.

FIGS. 6 and 7 illustrate casing 55 where the support is from the inner edge of its end wall rather than from the bottom edge of its cylindrical wall as in casing 50. Circular indentations 57, three in each direction and roughly having the shape of a quarter of a sphere, are formed on casing 50, which indentations serve in the mold design of 52 to vertically space the casing from the underside of the mold top and an upper horizontal surface of the mold bottom.

These indentations in the casing edges can readily be made in and by the equipment used to position the casings for insertion into the mold, i.e., they need not necessarily be formed at the time the casings are manufactured. Three indentations per contacting surface are preferably used, as this is the most stable configuration, although more can be used as desired. These projections, besides helping to stabilize the casing, also permit the rubber compound to flow in and about the edge of the casing. As the casings fall into the mold, the projections end up being randomly positioned in the mold. The force of the rubber flowing under the edge is usually sufficient to scour out any thin film of rubber left under the indentation of the preceding casing, thus avoiding mold contamination and buildup.

As can be appreciated, a design consideration in the mold of FIG. 1 is that whether or not the seal be molded "right side up" or "right side down," and whether or not the annular orifice be positioned on the sealing lip flank or, as is preferred, remote therefrom, the diameter of that portion of the center piece forming the annular orifice must be such as to permit the center piece to retract back through the seal.

In FIG. 1, annular shoulder 31 of mold bottom 30 mates and seals with annular wall 21 of the mold top 20. The fit is quite accurate to assure that orifice 45 is formed with a uniform cross sectional area around its periphery. Wall 21 contacts and seals with shoulder 31 prior to complete closing of the mold so that vacuum can be drawn as the mold is closing. The mold of FIG. 2 has a like sealing and alignment arrangement, although it is not illustrated.

Figure 3:
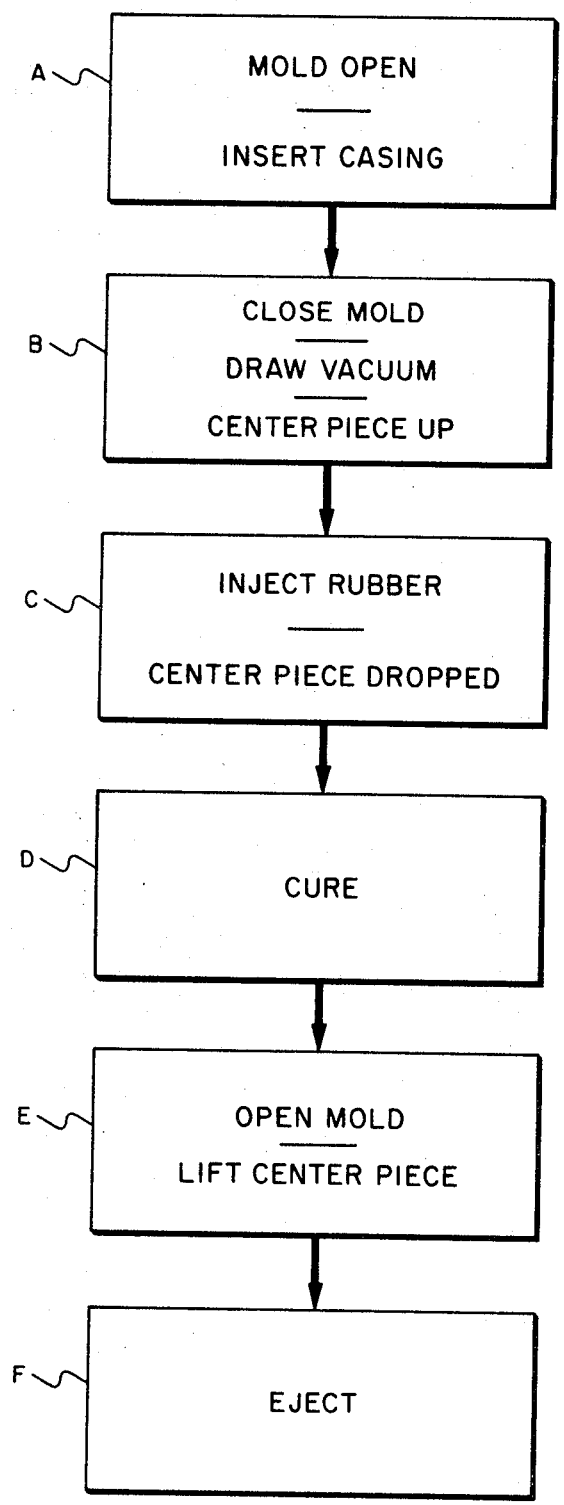
FIG. 3 is a flow chart of the operating cycle of the process.

With reference to FIG. 3, the steps of the molding cycle of this invention with the mold of FIG. 1 comprise:

A. With the mold open, insert the casing. The mold is maintained, e.g., electrically, at a temperature sufficient to prevent material heat loss from the cavity, e.g., at 460° F (as measured on the external surface). The center piece is held up by hydraulic means.

B. Close the mold. As the mold closes and shoulder 31 contacts wall 21, a vacuum is drawn on the cavity around stem 41.

C. As the mold seats, injection commences through sprue 48, and center piece 40 is seated. Injection is complete in 2 seconds or less, depending on the size of the part and the volume, kind and durometer of the rubber. The inflowing rubber, as is preferred, is divided in both the designs of FIGS. 1 and 2 by the leading edge of the casing facing the fine orifice so that some flows above and some below the casing in such a manner to equalize or overcome any forces against the surfaces thereof that would tend to lift or distort the casing. The force of inflowing rubber may be relied on to drive the center piece down and cause it to seat.

D. The rubber is given a short dwell time to cure, usually 10 seconds or less, and often less than 5 seconds.

E. The mold is opened, and during the opening the center piece is hydraulically lifted to free the oil seal from the mold bottom 30, and expose it.

F. The oil seal is then ejected as by "fingers" being inserted around the intermediate section 42 beneath the seal, and lowering the center piece and stripping the seal off onto the fingers.

Sprue 48 leaves a pip in the center of the tear cap which is necked and broken off upwardly in the sprue at a point where the rubber is substantially uncured. The tear cap is subsequently removed from the ejected piece and the piece is tumbled, if desired, to remove the tear line.

With reference to FIGS. 8 and 9, the mold, illustrated in cross section, is one used to commercially manufacture a stub shaft seal for a power-steering hydraulic unit. It has an O.D. of about 1.82 inches and an I.D. of about 1.27 inches.

The top of the three-piece mold is indicated at 81, the bottom at 82, and the center piece and 83. The center piece consists of a stem 84, an intermediate section 85, and a top section 86 fastened to the stem by threads. The stem contains a moveable flash lock ejector pin 87.

The reinforcing metal casing is shown at 95.

The molding composition is introduced via conduit 88 and is distributed to the top inner periphery of the seal by 4 distribution sprues 89 which terminate in downwardly directed orifice slits 90.

FIG. 9 is a view along the center line of the mold of an insert section 81a which has a broad truncated cone shape and is machined with radial grooves on its top surface and edges to form the distribution sprues 89 and orifice openings 90. It seats with a very close fit with top 81 and is held therein as by set screws 94 (not illustrated in FIG. 8). This "bridge" that carries the lateral runners over a portion of the shaft seal and then "drops" them to orifices anywhere on the part is considered to be an unusual design feature.

In this design, vacuum is drawn, as previously described, when the top 81 and bottom 82 of the mold come together during closing before the center piece is fully seated. In addition, however, this mold design also has an outer, circular, vacuum distribution channel 91, connected to the vacuum source by conduit 92. This helps in the quick evacuation of the mold cavity and also, after the center piece is seated and injection has commenced, helps to complete the removal of air and prevent air entrapment in the composition.

In this mold design, a flashless flat-to-flat seal is provided between upper center piece section 86 and the mold top 81 as indicated at "x," and, because it is mechanically difficult to provide for perfect matching throughout a mold, an outer 0.002 – 0.003 of inch flash gap is provided between the mold top and bottom, as indicated at "y." A flash ring is provided therein at 93. To assure complete filling of the mold, the charge weight is selected to assure that there is some overflow into this flash ring. This gives a desirable margin to accommodate normal variations in the properties of the molding composition.

This flash joint and ring can be done away with in some cases, and flashless joints can be made on both sides of the seal.

As can be seen, the top section of the center piece is recessed to provide a flash lock 96. The use of a flash lock arrangement as illustrated in FIG. 8 is believed to be unique.

This mold operates in the same general manner as previously described. As the mold opens and the top 81 and bottom 82 separate, the flash lock retains the flash material in the center of the mold causing the fingers of material in the sprues 89 to break at the orifice 90 and to be withdrawn from the sprues. After complete separation of the mold, the flash lock ejector pin 87 is sharply raised to pop the flash lock and retracted sprue material out of piece 86.

As a point of interest, the nature of ejection of the flash lock material permits one to determine the state of the cure of the molding composition. If the composition is overcured, the flash lock tends to break or fracture, leaving material behind. If it is undercured, the composition does not have enough elasticity and internal strength to pull the fingers from the sprues and to snap out of the flash lock cavity.

The outer flash ring formed in space Y and cavity 93 strips quite readily from the seal. The flash ring localizes the tear line and leaves a neat annular rim, say 0.010 inch wide, that need not be removed as it is in a non-critical area and is not offensive to the eye.

A unique feature of the 4 sprue mold design of FIG. 8 is that it combines injection molding and transfer molding features in such a way that the seal and flash pad (or cap) can be removed at one time, thus permitting automatic action of the molding machine in a simple manner. In ordinary transfer molding, the flash pad is trapped between the upper mold and plunger. The mold, therefore, has two openings at two levels, to permit removal of the part between the lower and upper portions of the mold and to permit removal of the flash pad between the upper part of the mold and the plunger. This makes extraction difficult and often requires manual prying. By use of the lateral transfer sprues or runners, the mold of this invention has to open in only one place to effect extraction, automatically, of the flash pad and shaft seal.

The lateral sprues permit the locating of the orifices anywhere radially on the part even though the flow is from a central nozzle.

A suitable composition for manufacturing the power steering hydraulic unit stub shaft seal is formed by simple blending of the following:

| Function | Ingredient | Parts per Hundred |
|---|---|---|
| Rubbers | Paracril CLT(1) | 25.00 |
|  | Paracril 2810(1) | 75.00 |
| Activators | Zinc Oxide | 5.00 |
|  | Stearic Acid | 1.00 |
| Accelerators | Cyuram MS(2) | 2.75 |
|  | Tetrine A(3) | 0.75 |
| Antioxidants | Agerite Prnsin D(4) | 1.50 |
|  | Agerite Whie(4) | 0.50 |
| Vulcanizing Agent | Kensmix Sulfur(5) | 0.85 |
| Plasticizers | TP-95(6) | 5.00 |
|  | Corax Wax(7) | 1.00 |
| Processing Aid | Molykote Type Z(8) | 0.82 |
|  | Antimony Trioxide | 0.58 |
| Fillers | Sterling SO-1(9) | 25.00 |
|  | Sterling NS(9) | 25.00 |
|  | Sterling MT(9) | 25.00 |
|  | TOTAL | 194.75 |

(1) Uniroyal, Inc., New York, N.Y.
(2) American Cyanamid Co., Bound Brook, N.J.
(3) E.I. duPont deNemours & Co., Washington, Del.
(4) R.T. Vanderbilt Co., New York, N.Y.
(5) Kenrick Petrochemicals, Bayonne, N.J.
(6) Thiokol Chemical Corp., Trenton, N.J.
(7) Napco Chemical Division, Diamond Shamrock Chemical Co., Newark, N.J.
(8) TEK Bearing Co.
(9) Cabot Corp., Boston, Mass.

The minimal physical properties of this composition are: Tensile — 2000 psi; Modulus at 100 percent elongation — 850 psi; Ultimate elongation — 250 percent; Specific gravity — 1.24 ± 0.2; Hardness — 70 ± 5.

With this compound and the mold design of FIG. 8 maintained at 450° F, and an inlet pressure of 40,000 psi (calculated) and a compound preheat termperature of 160° F., the pressure in the mold cavity after the orifice was about 5,000 psi (calculated) and the cure temperature was about 540° F for a dwell time of 5 seconds.

In the embodiment shown in FIG. 10, the cylindrical wall of the reinforcing case is located during molding externally of the mold cavity and a pressure seal is formed with a centrally apertured end wall of the case by two concentric knife-edge sealing lips or rings on the mold top and bottom pinching the end wall, which leaves distinctive coinage marks thereon. The knife-edge rings are offset radially so that there is a slight bending or crimping action on the metal end wall of the case to make up for any minor out-of-flatness in the case end wall and to assure positive elastomer molding composition cut-off at these lines.

The mold consists of three mating relatively movable main pieces, a mold top, a mold bottom and a center piece extending through the mold bottom and having a central flash ejector. A vacuum is applied to the mold cavity through the opening in the center piece accommodating the ejector, with the head of the ejector serving as a valve. The head of the ejector is recessed in the top of the center piece at the base of a flash-lock cavity.

Molding composition is injected through a central conduit in the mold top into the flash-lock cavity. Radial sprues run between the top face of the center piece and the bottom face of the mold top to the circular mold cavity from the flash-lock cavity, and terminate in very fine injection orifices, which create definite tear points for separation of the flash.

In operation, after injection and curing of the rubber, the mold is opened by first lifting the mold top, which causes the rubber to neck down and break off in the injection conduit in the mold top. The center piece is next lifted, effecting separation of the seal from the mold bottom. Then the ejector is raised to kick out the flash-lock which carries with it the cured material in the radial sprues. The sprue material separates readily, and cleanly, from the oil seal at the tear lines created by the injection orifices.

While a series, 2–6, of injection orifices are preferred to assure uniform distribution and clean break-off, one continuous annular orifice could as well be used, as discussed previously.

Usually a small amount of the rubber left in the injection conduit is at least partially cured, and it is not desirable for this material to find its way to the sealing lip of the oil seal in the next injection. In the present design, the first injection is down into the flash-lock cavity, which takes up and prevents this partially cured material from entering into the distribution sprues. This is considered to be quite an important design feature.

During the start of a cycle, the case is first inserted about the center piece. The mold top, which has an annular shoulder mating with the cylindrical wall of the case closes on the case and aligns it. The circular knife-edge sealing lips on the mold top and bottom engage the end wall of the case and seal it in place. The ejector is raised and the mold cavity is then evacuated via the sprues, flash-lock cavity and the ejector shaft in the center piece. The molding composition is then injected under very high pressure driving down and seating the ejector. The whole of the mold cavity is almost instantaneously filled.

With more particular reference to FIG. 10, the mold consists of four main machined pieces, all of which are circular about a common center line, a mold top 113, a mold bottom 110, a center piece 112 and center piece guide 111, locked to the center piece by a snap-on ring 114. The flash ejector is shown at 115 and it and it can be seen that it ends in a valve that seats in the base of a flash-lock cavity 117 in the face of the center piece 112.

The circular case is illustrated at 120. Spring fingers 121 (only one of which is shown in outline) about the mold serve to initially hold the case in place. The mold top has an annular shoulder 113a that engages the cylinder of the case and aligns it. As illustrated, the inner surface of the annular shoulder 113a forms the reverse surface of the oil seal, and the outer surface of the center piece 112 forms the inner surface of the oil seal, particularly the critical sealing lip, shown at 130. The secondary seal 131 is formed by the center piece 112 and the center piece guide 111.

Molding composition is injected through conduit 119 in injection barrel 121 through the mold top, into the flash-lock cavity 117 and then flows into the radial distribution sprues 118, e.g., six equally spaced sprues machined into the top of surface 112a of the center piece, tapering from the center to the injection orifices shown at 132. The bottom surface of the mold top forms the top surface of the distribution sprues 118, such that flash in sprues 118 and flash-lock 117 is integral and can be ejected as a single piece. Orifices 132 are formed between lips on the center piece and mold top under-surface.

The seal between the end wall of the case and the mold is effected by providing on the mold top and bottom, shown at 135 and 136 respectively, concentric circular sealing lips which press into the end wall of the case. These sealing lips are preferably deliberately offset. If they were opposed, either the mold machine might not exert enough closing force to compress the metal and assure that the mold would not be held slightly open by any warp in the case, or if the case metal were thin, the sealing lips might not contact the case all around and there would be out-flow of the molding composition.

During mold closure, ejector 115 initially remains raised a few thousandths of an inch and vacuum is applied to the mold cavity via the ejector shaft 116, past the ejector seat, and thence through flash-lock cavity 117, sprues 118, and orifices 132. The force of the incoming molding composition through 119 helps seats ejector 115.

After cure, the mold is opened by first raising and clearing top 113, then raising center piece 112 and ejector 115 to free the case 120 from the mold bottom, and next further sharply raising ejector 115 to knock out the flash, after which metal fingers (not shown) are inserted under case 120 to pop the oil seal off center piece 112.

What is claimed is:

1. A single cavity injection mold of at least three pieces defining a mold cavity of circular configuration having a common center line, said pieces comprising:
   i. a mold top defining at least in part a fine orifice into said mold cavity and having an injection conduit connecting said fine orifice with a source of molding composition;
   ii. a mating mold bottom adapted to accomodate and mate with a center piece; and
   iii. a center piece extending through said mold bottom, mating therewith and defining at least in part an interior wall of the object to be molded, said center piece having a frusto-conical lower portion serving as a valve and mating with said mold bottom as a valve seat, a conduit connecting an evacuating means with said valve seat, said center piece being moveable a few thousandths of an inch upward into said mold cavity to open said valve and to free the molded article from said mold bottom, said valve including means for maintaining said valve in an open position as said mold cavity is being closed, evacuating means for placing a vacuum on said mold cavity through said valve means for closing said valve for of injection of a molding composition into said mold cavity.

2. The mold of claim 1 wherein an outer annular shoulder mates with an outer annular wall of said mold top and bottom serving both to align the two and to form a seal against an interior vacuum, which seal is formed before said mold top and bottom are fully seated.

3. The mold of claim 1 when adapted to mold a circular oil seal with a metal casing insert, and wherein said center piece is composed of three sections: a stem, an intermediate section, and a top section, said top and intermediate section defining the interior surfaces of said oil seal and the critical oil seal lip, and said intermediate section having the diameter of the largest internal diameter of said oil seal.

4. The mold of claim 3 wherein an upper edge of said center piece and an inner wall of said mold top form said fine orifice, the same being annular, and wherein said mold top contains an annular accumulation and distribution cavity disposed between said fine orifice and said source of said molding composition, and wherein the mold parts mate to form a flashless joint about the outer circumference of said oil seal.

5. The mold of claim 4 wherein said top surface of said center piece forms with the under surface of said mold top a disk-shaped distribution conduit connecting said source of molding composition with said accumulation and distribution cavity.

6. The mold of claim 5 wherein said top section extends through said casing insert, wherein the diameter of said annular orifice lies within the largest diameter of said top section, and wherein the design of said oil seal is such that said oil seal is capable of being stripped off said center peice over said top section.

7. The mold of claim 3 wherein there are at least three of said fine orifices uniformly spaced about said injection conduit, the same being centrally located, said orifices being individually connected thereto by radial sprues, said critical oil seal lip being positioned in said mold cavity at a point remote from said injection orifices.

8. The mold of claim 7 wherein said top section of said center piece is recessed to form a flash lock connecting with the material in said sprues, wherein said center piece contains ejecting means for ejecting said flash lock, said flash lock along with the material in said sprues being first extracted from said mold top during mold opening and thereafter being ejected from said center piece with said ejecting means.

9. The mold of claim 7 wherein said top section of said center piece and the bottom surface of said mold top meet to form a flash-less joint at the inner periphery of said oil seal, and the mold parts are lightly gapped externally and circumferentially about said oil seal to form a flash joint.

10. The mold of claim 1 comprising in addition a removeable bridge section circular about said center line, inset in said mold top in the face thereof contiguous to said mold cavity, and defining with said mold top at least three radial distribution runners running between said bridge section and mold top from said injection conduit towards the periphery of said mold cavity which runners terminate in orifices downwardly directed into said mold cavity.

11. In a single cavity injection mold adapted to the repetitive molding of a circular shaft seal having an interior elastomeric sealing lip reinforced with a cylindrical case thereabout, said mold comprising at least three main circular sections having a common center line and defining a mold cavity, viz:

1. a mold top defining at least in part a fine orifice into said mold cavity and having a radial sprue connecting said fine orifice with a source of molding composition centrally supplied through an injection conduit in said mold top;

2. a mold bottom mating therewith and adapted to accommodate and mate with a center piece; and 3. a center piece extending through said mold bottom, mating therewith and defining at least in part an interior surface of said lip and at least a portion of said sprue, the upper surface of said center piece having an upwardly opening flash-lock cavity communicating with said injection conduit, said center piece accommodating a flash-lock ejector adapted to seal in the base of said flash-lock cavity to form a seal and to be raised relative to said center piece to allow vacuum to be applied to said mold cavity;

said mold including means adapted to apply a vacuum communicating with the underside of said flash-lock ejector seat;

and said case having an inner directed annular end wall to which said elastomeric sealing lip is bonded;

the improvement comprising:

a. a downwardly directed annular cylindrical shoulder on said mold top about said mold cavity the outer cylindrical surface of which is adapted to mate with the inner cylindrical surface of said case and to align the same with respect to said mold cavity, said annular shoulder defining at least in part a surface of said elastomeric sealing lip and ending in a downwardly directed circular knife-edge sealing lip adapted to engage and form a seal with said annular end wall, and b. a portion of the combination of said center piece and said mold bottom underlying said circular end wall having an upwardly directed knife-edge sealing lip adapted to engage and form a seal with said annular end wall, the circles of said knife-edge sealing lips being concentric and slightly radially displaced one from the other.

the whole of said mold being adapted to form a vacuum-tight mold cavity with said case with the cylindrical wall of said case being external thereof, and after completion of injection of said molding composition and curing during a cycle, to open first with said mold top being separated from said oil seal, followed by said flash-lock ejector and center piece each being raised to eject the flash-lock along with the cured material in said sprue separated at the tear line created by said fine orifice and to free said oil seal from said mold.

12. The mold of claim 11 wherein said upwardly-directed knife-edge sealing lip is located near the annular edge of said center piece and wherein after said mold is closed and the seals are established by said knife-edge sealing lips said ejector is adapted to be in the raised position to permit the application of vacuum through said seat and to be closed upon the commencement of injection.

* * * * *